Sept. 9, 1969                F. D. EZEKIEL ET AL                3,465,574
                        IN-LINE FLOW POWERED VISCOMETER
                               Filed May 1, 1967
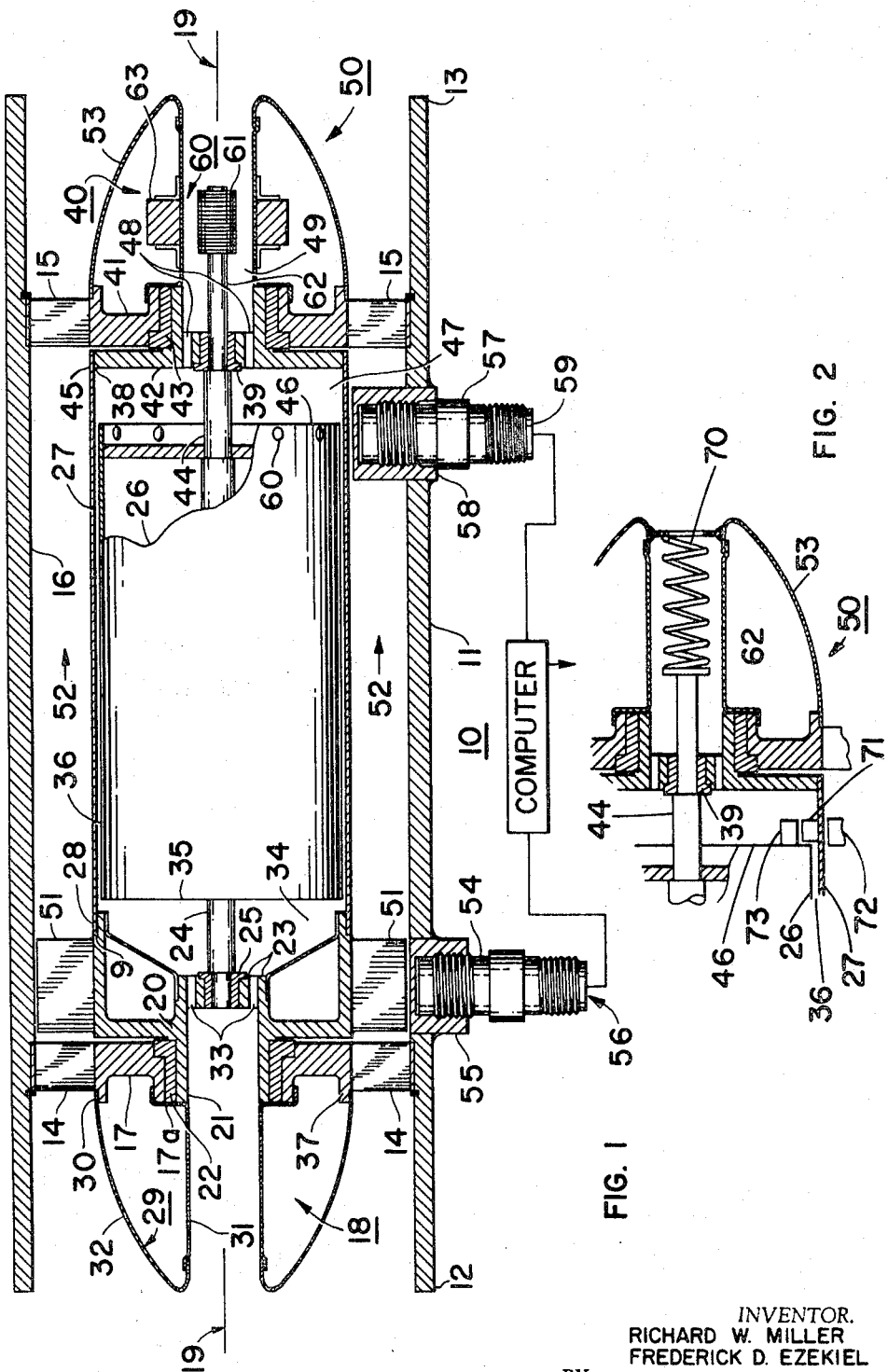
INVENTOR.
RICHARD W. MILLER
FREDERICK D. EZEKIEL
BY David E. Hoppe
ATTORNEY

United States Patent Office 3,465,574
Patented Sept. 9, 1969

3,465,574
IN-LINE FLOW POWERED VISCOMETER
Frederick D. Ezekiel, Lexington, and Richard W. Miller, Foxboro, Mass., assignors to The Foxboro Company, Foxboro, Mass., a corporation of Massachusetts
Filed May 1, 1967, Ser. No. 635,025
Int. Cl. G01n 11/00
U.S. Cl. 73—59                                6 Claims

ABSTRACT OF THE DISCLOSURE

Two concentric drums, each adapted to rotate on their axis, are disposed in a pipe with the axes of the drums on the pipe center line. Vanes on the surface of the outer drum impart rotation thereto from the force of fluid flowing through the pipe. A predetermined restraining torque is applied to the inner drum. As the fluid flows through the pipe, the torque-restrained inner drum will rotate more slowly than the outer drum and the difference in the rotational speeds is inversely proportional to the viscosity of the fluid in the annular space between the drums.

---

This invention relates to viscometers generally, and more particularly to in-line viscometers driven by the flow of fluid through the pipeline in which they are located.

The viscometer art includes laboratory instruments of the rotational variety, in which one of two concentric cylinders is driven at a predetermined speed by a motor, with the other cylinder being torqued through the medium of fluid filling the annular space between the two concentric cylinders. The torque effect upon the second cylinder is generally proportional to the viscosity of the torque-transmitting fluid. Alternatively, rotational viscometers also include those in which a constant torque is applied in a manner to rotate one of the concentric cylinders; the consequent speed of rotation of the other cylinder is then an indication of fluid viscosity. In commercial viscometers, it is usually the practice to have either the torque upon, or the speed of rotation of, the driving cylinder held to a predetermined amount so that the viscosity indication can be accurately related thereto.

The present invention proposes a viscometer powered by the flow of fluid through a pipeline in which the viscometer is disposed. In the proposed viscometer, the flow of fluid imparts rotation to one of two concentric drums, the rotational speed being variable, in that the speed is related to the fluid flow rate. The viscometer may operate over a broad range of fluid flow rates.

Briefly stated, an in-line viscometer configuration having two concentric drums is disposed in a fluid stream, the outer drum being rotated in accordance with the fluid flow rate, with the inner drum having a constant restraining torque applied thereto. The viscosity of the fluid in the annular spacing between the two drums determines a speed differential between the outer drum and the inner restraining drum, which differential is proportional to the reciprocal of fluid viscosity.

A viscosity measurement may conveniently be obtained by providing read out means for sensing the frequency of rotation of each drum. Illustratively, read out means could be designed for each drum, each read out means producing the equal number of output pulses per drum rotation. The difference between the frequency of pulses generated by each drum is then proportional to the reciprocal of viscosity.

Alternatively, a viscometer having two concentric drums as herein described may have a variable restraining torque applied to the inner drum by a simple torsion or spring means. This method of applying restraining torque balances the torque application to the inner drum from the fluid viscosity effect with an equal and opposite restraining torque. The applied torque increases with both rotational speed of the outer drum and fluid viscosity, and the inner drum is angularly positioned by the applied torque to an angle developing in the associated restraining torque means an equal restraining torque to counterbalance the speed and viscosity effects. In this application, the viscosity of the intervening fluid in the annular spacing between the drums is proportional to the time interval required for a radius of the outer drum to travel from a reference on the pipeline housing to a point on the inner torque-restrained drum which was in radial alignment with the stationary reference at zero torque.

With either arrangement, the separate motor drive usually required for viscometers is eliminated. In addition, the simplicity of the method for obtaining driving force contributes to reliability and the ability of the viscometer to perform well over a long term.

The viscometer configuration proposed adapts easily to digital techniques for interpreting the significance of the viscometer output, and is thereby particularly suitable for application with computer systems. Other objects of the invention will be in part apparent from the specification herewith and in part from the figures, in which:

FIGURE I is a cross-sectional view of a viscometer taken along the axis of rotation;

FIGURE II is a cross-sectional view of the torque-restraining portion of the viscometer, showing an alternate method of restraining the inner drum.

Referring to FIGURE I, viscometer 10 is mounted within a section of flow-conducting pipe 11 having a generally cylindrical form, which pipe 11, as may be seen in FIGURE I, serves as a housing for components of viscometer 10. Pipe 11 may conveniently have attached thereto at end 12 and end 13 flanges (not shown) for connecting viscometer 10 into a run of flow piping. Illustratively, end 12 is the flow inlet end of pipe 11 and end 13 is the flow outlet of pipe. Support members 14 and 15 are mounted to the interior wall 16 of pipe 11. Support members 14 and 15 are designed to impede the passage of fluid minimally, while providing sufficient rigidity to support the various components of viscometer 10. Illustratively, four support members 14 and four support members 15 may be equally spaced in respective radial planes to perform a supporting function having a high degree of rigidity. Support members 14 are disposed in a radial plane in a manner to carry outer casting 17 of dual concentric bearing assembly 18, the axial center of all the components of bearing assembly 18 being on center line 19 of pipe 11. The intermediate casting 20 of concentric bearing assembly 18 comprises a section 21 to which is mounted a bushing 22 adapted for an inwardly concentric rotatable fit with race 17a of outer casting 17, and also comprises a section 23 for centrally carrying bushing 25 attached to axle 24 of inner drum 26; thus intermediate casting 20 and axle 24 are each independently rotatable on centerline 19 of pipe 11. Intermediate casting 20 also supports end 28 of outer drum 27 which is mounted to periphery 9 of casting 20. Bearing assembly 18 thereby supports end 28 of outer drum 27, and also supports axle 24 of inner drum 26, both in independently rotatable relationship concentric with center line 19.

Bullet 29 is mounted by flared end 30 thereof to the periphery 37 of casting 17, and is provided with a central flow passage 31 therein oriented on centerline 19. Most of the flow through pipe 11 is conducted past outer surface 32 of bullet 29, past support members 14, and thence continuing downstream. A small proportion of the flow enters central passage 31 of bullet 29 and passes centrally downstream along centerline 19, passing through apertures 33 in casting 20 to be admitted into space 34 adjacent end 35 of inner drum 26. From space 34 the fluid passes into the annular space 36 between the outer surface of inner drum 26 and the inner surface of outer drum 27. The amount of flow through central passage 31 into annular space 36 is small but sufficient to respond quickly to variations in viscosity in the fluid flowing through pipe 11.

Referring now to dual concentric bearing assembly 40, carried by support members 15, a configuration similar to that of bearing assembly 18 is provided, in which outer casting 41 is fixedly mounted by support members 15. An intermediate casting 42 with bushing 43 concentrically mounted therewith is carried inwardly by and concentric with casting 41 in a manner to permit rotation thereof. An axle 44 with bushing 39 affixed therewith is carried centrally by intermediate casting 42.

Periphery 38 of intermediate casting 42 carries end 45 of outer drum 27, and axle 44 carries end 46 of inner drum 26. Thereby, and in conjunction with bearing assembly 18, both outer drum 27 and inner concentric drum 26 may each rotate independently in respective axial alignment.

Means are provided for the exit of fluid from annular space 36 between outer drum 27 and inner drum 26. Annular space 36 opens into end space 47 adjacent end 46 of inner drum 26. From there, flow exits through apertures 48 in intermediate casting 42, the flow then leaving through central passage 49 in bullet 50 to be disposed downstream at end 13 of pipe 11.

Vanes 51 are attached to the periphery of intermediate casting 20, being disposed in the annular spacing 52 between the outer surface of outer drum 27 and the inner wall 16 of pipe 11. Thereby, the main flow passing along the outer surface 32 of bullet 29 imparts rotational force through vanes 51 to intermediate casting 20 and outer drum 27 attached thereto. The main flow passes by vanes 51, through annular spacing 52, support members 15 and past outer surface 53 of bullet 50 to exit downstream. The rotational velocity of outer drum 27 will vary in response to the flow rate of the main stream of fluid through annular space 52 between outer drum 27 and inner wall 16 of pipe 11.

Hysteresis brake assembly 60, a commercially-available item, has its torqued element 61 concentrically mounted on extension axle 62, an extension of axle 44 through intermediate casting 42 of bearing assembly 40 in the direction of the downstream side of drum 27. The magnetic torquing element 63 of hysteresis brake assembly 60 is outwardly concentric with torqued element 61, torquing element 63 being fixedly mounted within the enclosure formed by the outer shaping surface 53 and inner passage 49 of bullet 50. Hysteresis brake assembly 60 is a combination producing a constant value of restraining torque on extension axle 62, to which element 61 is concentrically mounted independent of the speed of rotation of extension axle 62. In this manner a constant restraining torque is applied by means of hysteresis brake assembly 60, restraining the rotation of inner drum 27 independent of the rotational speed of drum 27.

Conveniently, a magnetic pick-up 54 may be threaded through tap 55 in pipe 11 to sense the passage of each vane 51 in relation thereto. Output signal 56 from magnetic pick-up 54 is then a pulse train having a frequency proportional to the rotational speed of outer drum 27.

A second magnetic pick-up 57 is threaded through tap 58 of pipe 11 to sense the passage in relation thereto of each aperture 60 near end 46 of inner drum 26. Outer drum 27 preferably is constructed of relatively non-magnetic material so that magnetic pick-up 57 sensor may clearly sense the passage of apertures 60 through the material of outer drum 27. Output 59 is then a pulse train having a frequency proportional to the rotational speed of inner drum 26.

The signals at output 56 and output 59 may be conveniently combined by suitable means in a manner to produce a resultant difference frequency, which then represents the reciprocal of viscosity of the fluid in annular space 36 between inner drum 26 and outer drum 27. Illustratively, outputs 56 and 59 may be transferred to a digital computer, which by digital subtraction techniques may produce a resultant difference signal which may be digitally converted to the equivalent viscosity indication. Alternatively, each output signal 56 and 59 may be first converted to an equivalent analog signal, and the results simply subtracted by appropriate means.

A technique using a minimum of computer time is based on a periodic sampling program. As often as it is required to evaluate viscosity, the computer orders the viscosity measurement sub-routine. Illustratively, the computer checks output 56, awaits the first pulse, then measures the time interval to the second pulse. At the same time, or after reading the second pulse at output 56, the computer similarly measures the time interval between two successive pulses at output 57. The measured intervals are converted to frequency (speed of rotation), then differenced. The reciprocal of the result is proportional to viscosity.

Referring now to FIGURE II, extension axle 62 of drum 26 is shown associated with a spring torsion restraining means 70, which may be a simple coil spring attached to axle 62 and grounded to an adjacent portion of bullet 50. By this means a torque variable with inner drum 26 angular rotation is substituted for the constant torque applied by hysteresis brake assembly 60. With this alternate arrangement, the torque applied to inner drum 26, which is a result of the combination of the rotational speed of outer drum 27 and the fluid viscosity in intervening annular space 36 between inner drum 26 and outer drum 27, produces an angular rotation of drum 26 sufficient to wind up torsion restraining means 70 to produce a counter-torque preventing further angular rotation of inner drum 26. That is, torsion-restraining means 70 produces a restraining torque on inner drum 26 through its extension axle 62 and axle 44 which is equal to the torque transmitted to inner drum 26 through the intervening fluid viscosity medium in annular space 36. The balance of inner drum 26 thus achieved is significant of the viscosity of the intervening fluid in annular space 36 in that the time interval between passage of a radius of outer drum 27 from a zero reference point on pipe 11 to the point on the angularly displaced inner drum 26 which was originally radially aligned with said zero reference on pipe 11 in the no-flow condition of viscometer 10, is a time interval proportional to the viscosity of the intervening fluid in annular space 36. Convenient read out means for determining this interval may employ a permanent magnet 71 located on the periphery of rotating outer drum 27 and pick-up sensor 72 located at the zero reference of housing 11 and pick-up sensor 73 located at the zero torque point on inner drum 26. Inasmuch as inner drum 26 is limited in its angular rotation, output wires (not shown) may be run from pick-up sensor 73 along axle 44 of drum 26, and from axle 44 by a flexible connection paralleling torsion restraining means 70, for example, and thence to the exterior of housing 11, as may be conveniently arranged.

While there has been shown what is considered to be a preferred embodiment of the invention, it will be manifest that many changes and modifications may be made therein without departing from the essential spirit of the invention. It is intended, therefore, to cover all such changes and modifications as fall within the true scope of the invention.

What is claimed is:
1. An inline viscometer comprising:
 a housing adapted to conduct a flow of fluid therethrough,
 a first drum rotatably mounted within said housing means responsive to the flow of fluid through said housing for imparting rotation to said first drum, a second drum rotatably mounted within said housing concentric with said first drum, means for applying a restraining torque to said second drum with respect to said housing in which said restraining torque is constant and independent of rotational speed of said second drum, means for conducting a sample of said fluid into an annular space between said first and second drums, and readout means for determining the difference in rotational speeds of said first and second drums with said difference in rotational speeds being generally proportional to the reciprocal of viscosity of said sample of said fluid, whereby the torque transmitted to said second drum is a function of both the rotational speed of said first drum and the viscosity of the fluid in said annular space between said first and second drums which transmitted torque in conjunction with said restraining torque produces a differential effect related to fluid viscosity.

2. The inline viscometer of claim 1, wherein said first drum is outwardly concentric with said second drum and the axis of both drums are aligned with the direction of flow through said housing and said first drum has impelling means mounted thereto on its outer surface being positioned to substantially intercept the flow of fluid passing in the annular space between said first drum and the inner wall of said housing thereby imparting rotational force to said first drum.

3. The inline viscometer of claim 2, wherein said constant restraining torque is produced by a hysteresis brake.

4. An inline viscometer comprising:
a housing adapted to conduct a flow of fluid therethrough, a first drum rotatably mounted within said housing, means responsive to the flow of fluid through said housing for imparting rotation to said first drum, a second drum rotatably mounted within said housing concentric with said first drum, means for applying a restraining torque to said second drum with respect to said housing wherein said restraining torque is variable with angular rotation of said second drum, means for conducting a sample of said fluid into an annular space between said first and second drums, and means for measuring the time interval for a radius of said first drum to sequentially intercept a reference on said housing and a point on said second drum originally opposite said reference at the zero-torque condition of said viscometer with said time interval being generally proportional to the viscosity of said sample fluid, whereby the torque transmitted to said second drum is a function of both the rotational speed of said first drum and the viscosity of the fluid in said annular space between said first and second drums which transmitted torque in conjunction with said restraining torque produces a differential effect related to fluid viscosity.

5. The inline viscometer of claim 4, wherein said first drum is outwardly concentric with said second drum and the axis of both drums are aligned with the direction of flow through said housing and said first drum has impelling means mounted thereto on its outer surface being positioned to substantially intercept the flow of fluid passing in the annular space between said first drum and the inner wall of said housing thereby imparting rotational force to said first drum.

6. The inline viscometer of claim 5, wherein said variable restraining torque is produced by torsion means.

References Cited
UNITED STATES PATENTS 3,347,089  10/1967  Perry _____ 73—59
3,355,947  12/1967  Karlby et al. _____ 73—230

LOUIS R. PRINCE, Primary Examiner

J. W. ROSKOS, Assistant Examiner